Aug. 13, 1968   M. B. SAMPSON   3,396,982
CHUCK
Filed Oct. 4, 1965   2 Sheets-Sheet 1
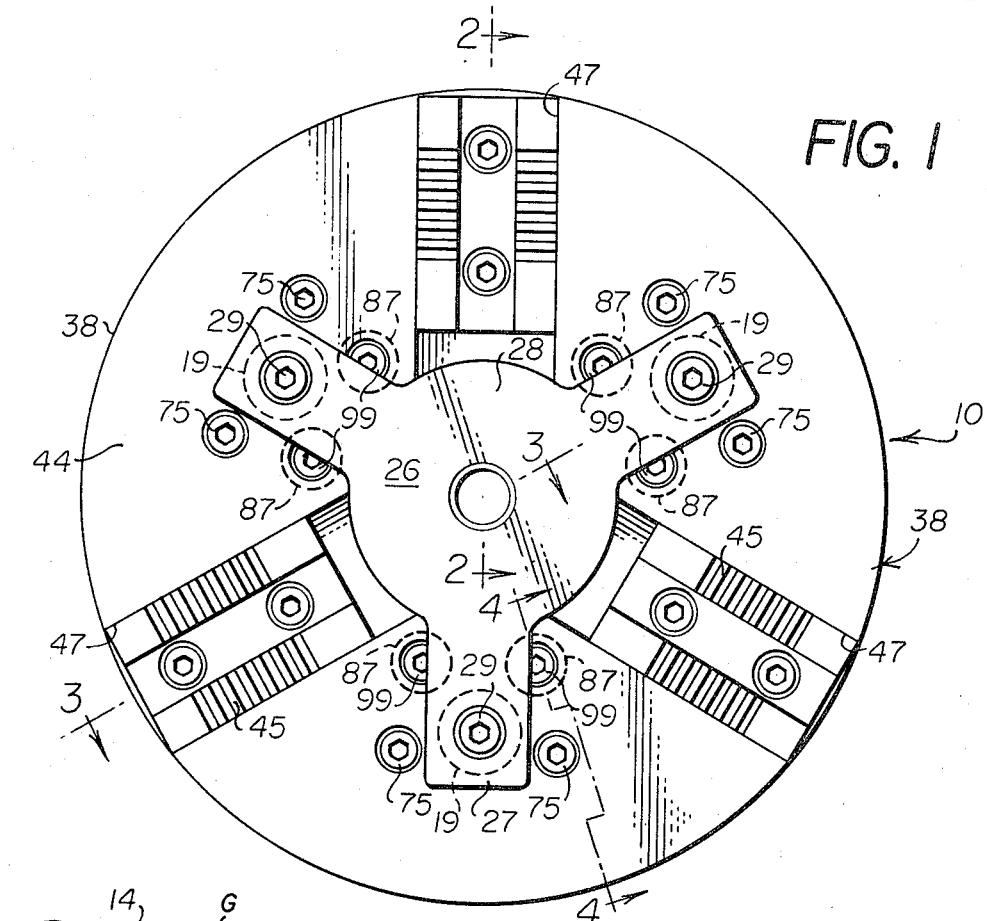
FIG. I
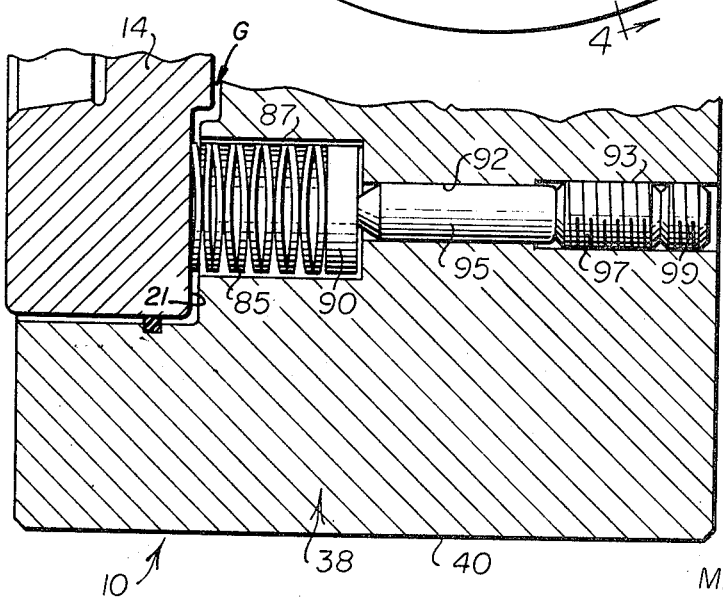
FIG. 4
INVENTOR.
MERRITT B SAMPSON
BY Watts & Fisher, attys.

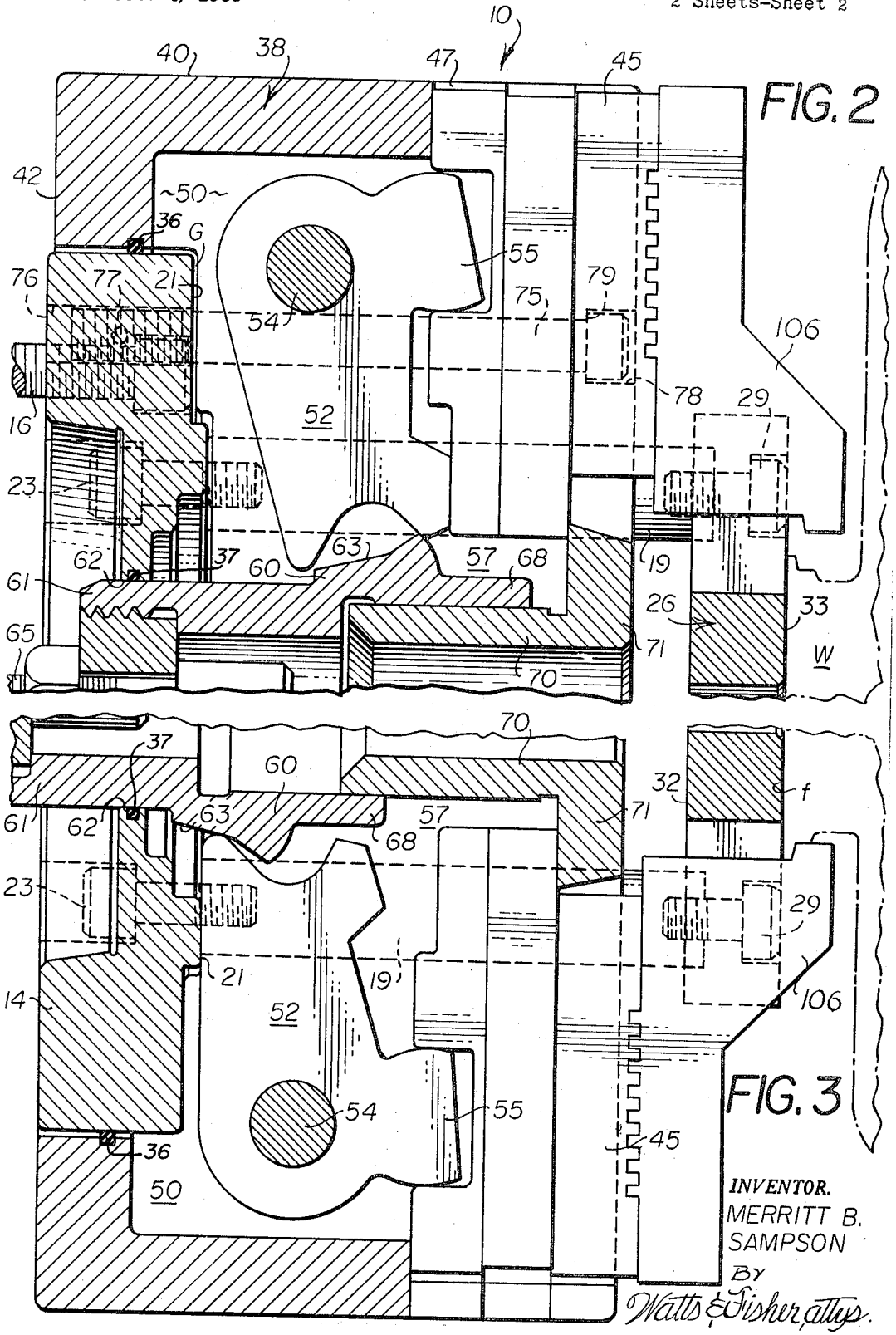

United States Patent Office 3,396,982
Patented Aug. 13, 1968

3,396,982
CHUCK
Merritt B. Sampson, Shaker Heights, Ohio, assignor to The S-P Manufacturing Corporation
Filed Oct. 4, 1965, Ser. No. 492,717
10 Claims. (Cl. 279—120)

This invention relates to a chuck, and more particularly to an improved pull-back chuck for use as a rotary work holder with machine tools.

The present invention is utilized in a rotatable chuck having radially movable work engaging jaws that uniformly close about the longitudinal center axis of the chuck so as to accurately center the work piece. This type of chuck is known in the art as a universal chuck, and the present invention is particularly applicable to universal chucks of the lever actuated type. Lever actuated chucks provide extremely high gripping forces and are therefore advantageously used where a heavy work piece is to be held or where high speed and/or heavy cutting rates are employed.

In machining many products, it is necessary to orient a circular, axially extending, surface with respect to radially disposed base surface. In such instances, it is conventional to first machine the base surface as a reference surface. The work piece is then chucked with the finished reference surface properly oriented and the circular surface is then turned. In the chucking operation, it is necessary that the work piece be positioned with its reference surface against a locating surface on the radial face of the chuck, and be secured with respect thereto, so that the circular surface to be turned will be oriented with its axis normal to the radially disposed base or reference surface of the work piece. It is desirable that the chuck be constructed so that it will pull the work piece back to force the reference and locating surfaces into abutment.

Some prior pull-back chucks have employed a rocking jaw principle to provide two components of force, one tending to squeeze the work piece between opposed jaws and the other component tending to pull the work piece back toward a locating surface on the chuck. Wedge-type chucks or draw collets have also been used to effect pullback. With these arrangements, the holding power of the chuck is appreciably reduced due to the divided component of force used to provide both the gripping or squeezing force and the pull-back force. It will readily be appreciated that any arrangement that results in the reduction of gripping power detracts from the work capacity of any chuck and with lever actuated chucks detracts from the principal feature, which is the high gripping force that is attainable.

It has also been proposed to utilize separate work engaging jaws to exert a pull-back force on the work piece. For example, in a conventional three jaw chuck, it has been proposed to provide six jaws, three being radially movable to grip the work piece and three being axially movable to hold the work piece in tight engagement with the reference surface of the chuck. While this approach substantially maintains the gripping power of a conventional three jaw chuck, the cost and complexity are high.

In co-pending application Ser. No. 411,450, filed Nov. 16, 1964, now Patent No. 3,252,708, entitled Universal Jaw, assigned to the assignee of the present invention, a pull back arrangement is provided where oblique gripping edges on the chuck jaws bite into the work piece, exerting a wedging force that forces the work piece axially toward and against a locating surface on the chuck. While such an arrangement has been found to be satisfactory, a limited amount of pull back is effected.

Many of the foregoing disadvantages can be overcome by providing a chuck mounting plate that carries a fixed locating surface and an axially movable chuck body. Radially movable jaws carried by the chuck body grip the work piece and axial movement of the chuck body relative to the mounting plate pulls the work piece back against the locating surface. The present invention provides an improved chuck of this construction that may be readily adjusted to require different degrees of pull-back force to cause axial movement of the chuck body and which may be readily adjusted to vary the magnitude of the axial movement provided. An outstanding feature of this invention is that the chuck may readily be clamped in pulled-back position to function in the manner of an ordinary universal chuck.

Briefly, the chuck assembly of the present invention comprises a mounting plate adapted to be securely fastened to a rotary spindle of a machine tool. A plurality of peripherally spaced slide bars or mounting rods extend axially from the radial face of the mounting plate, and a chuck body is carried on these rods. Thus, the chuck body must rotate with the mounting plate but may be moved axially with respect thereto along the mounting rods. The chuck body carries radially movable master chuck jaws that are operated by levers pivoted on lever pins and actuated by a central draw cam, all within the chuck body. A plate having a locating surface is carried in fixed spaced relationship with the mounting plate in front of the chuck body and master chuck jaws but behind the work engaging jaws carried by the master chuck jaws. This allows radial movement of the master jaws and the use of a central dust bushing in the chuck body in the normal manner, while providing a locating surface behind the work piece. A plurality of springs positioned between the mounting plate and the chuck body bias the chuck body away from the mounting plate and toward the locating surface. The force required to compress these springs may be adjusted to vary the gripping force applied to the work piece before the chuck body is moved axially.

The jaws of the chuck are moved radially from an open position to a closed position, i.e., toward the central axis of the chuck, in response to axial movement of the draw cam as it is pulled toward the base plate of the chuck by a draw rod associated with the spindle of the machine tool. When the jaws contact the work piece their radial movement stops. Further movement of the draw cam then pulls the chuck body along the mounting rods toward the chuck mounting plate against the bias of the springs. This causes the jaws to pull back the work piece into contact with the fixed locating surface. When the finished radial reference surface of the work piece contacts the locating surface of the fixed plate of the chuck, further force on the draw cam is thereafter transmitted as radial gripping power through the chuck jaws. Thus, while an amount of force sufficient to overcome the spring force biasing the chuck body away from the mounting plate is lost or subtracted from the chuck actuating force, this force is essentially constant and is relatively small. Accordingly, there is but a small loss of gripping power, particularly as compared with known arrangements which divide the gripping power into two separate components. Moreover, the jaw movement and the gripping force act in a radial direction for optimum strength and accuracy.

With most known devices, any applied force is divided, whereas with the present arrangement additional force, over that needed to overcome the spring force biasing the chuck body away from the mounting plate, all contributes to the gripping power of the jaws. Moreover, the entire force that is applied to the jaw actuating levers, which are pivoted on lever pins mounted within the chuck body, also holds the chuck in withdrawn or pulled-back position. Rearward movement of the chuck is resisted by the fixed locating surface that limits the backward movement of the work piece engaged by the chuck jaws. Thus, the full action force of the draw rod is applied radially to the work piece through the jaws, and the full reaction force is exerted through the work piece and upon the fixed locating surface, thereby holding the work piece in proper position.

With the present arrangement a plurailty of axially adjustable stop members, which are independent of the slide bars, are carried by the base plate. These members coact with the chuck body, limiting the axial movement of the chuck body away from the base plate under the biasing force of the springs. With this arrangement, the chuck may be readily and conveniently converted to a standard chuck by merely pulling the chuck into engagement with the base plate against the spring bias and clamping it there with the adjustable stop members so that it is no longer axially movable on the slide bars.

Other attendant advantages of this invention will be readily appreciated as the invention becomes better understood by reference to the following detailed description, when considered in connection with the accompanying drawings in which:

FIGURE 1 is a front elevational view of a chuck constructed in accordance with invention and showing a fixed locating plate for locating a finished radial surface of a work piece;

FIGURE 2 is a partial transverse sectional view of the chuck of FIGURE 1, taken along the line 2—2, looking in the direction of the arrows, and illustrating the chuck jaws in open position and the chuck body in a forward position away from the base plate;

FIGURE 3 is a partial transverse sectional view of the chuck of FIGURE 1, taken along the line 3—3, looking in the direction of the arrows, and illustrating the chuck jaws in a closed position and the chuck body in a pulled-back position with the work piece held flush against the fixed positioning plate; and FIGURE 4 is a fragmentary view, partly in section taken along the line 4—4 of FIGURE 1 looking in the direction of the arrows and showing in detail a spring that biases the chuck body away from the mounting plate.

Referring now to the drawings, the chuck is indicated generally by the reference numeral 10 and is adapted to be mounted to the end of a rotatable spindle of a suitable machine tool, for example, the spindle of a lathe. The chuck 10 is mounted on the spindle by a circular mounting plate 14. Peripherally spaced spindle screws 16 secure the mounting plate 14 to the spindle.

Three axially extending rods 19, of equal length, extend from a front surface 21 of the mounting plate 14. The rods are spaced equal radial distances from the center of the mounting plate 14 and are located at positions spaced 120 degrees from each other about the circular plate 14. Suitable cap screws 23 extending through the mounting plate 14 from the back surface thereof secure the rods 19 to the mounting plate 14.

A spider-shaped fixed plate 26 has three spider portions or legs 27 extending from a central circuiar portion 28 at locations equally spaced from each other 120 degrees about the periphery of the circular portion 28. The plate 26 is secured to the other ends of the axially extending rods 19 by suitable cap screws 29 recessed in the spider portions 27. Finished inner and outer surfaces 32, 33 are provided on the fixed plate 26. The finished outer surface 33 provides a locating surface for a work piece having a reference surface; e.g., a work piece having a finished radial face that is to be oriented at right angles to a circular surface to be turned. It will be apparent from this construction that the fixed plate 26 having a locating surface 33 is fixed in spaced relationship with the circular mounting plate 14 secured to the machine tool spindle.

A cylindrical chuck body 38 is carried by the rods 19 of the circular mounting plate 14. The chuck body 38 has a cylindrical peripheral wall 40 and an annular rear flange 42 that encircles the mounting plate 14. It also includes a radial front face 44 and three radially movable master jaws 45 that slide in guide ways 47 in the chuck body. Cavities 50 are provided in the chuck body behind each radial jaw 45 and each houses an operating lever 52 pivotally mounted on a lever pin 54 journalled in the body of the chuck. A central cavity 57 extends axially through the chuck body 38 and communicates directly with the cavities 50. An annular draw cam 60 is mounted within the central cavity 57 and has an axially extending portion 61 that extends through a central opening 62 in the mounting plate 14. The draw cam 60 includes a cam surface 63 located within the central cavity 57 for cooperating with one end of each operating lever 52 so that axial movement of the draw cam 60 rotates the operating levers 52 about their respective lever pins 54. A short arm 55 of each lever 52 engages a notch in the back of each radial jaw 45 so that rotation of the operating lever 52 about the lever pin 54 causes radial movement of the jaws 45 in the chuck body. A draw screw 65 that connects with a draw rod (not shown) carried centrally of the machine tool spindle is attached to the axially extending portion 61 of the draw cam 60. When the draw rod and screw 65 are pulled rearwardly of the chuck 10 by an actuating cylinder (not shown) carried by the machine tool, the draw cam 60 moves rearwardly of the chuck body toward the mounting plate 14 and rotates the operating levers 52. A front axially extending portion 68 of the draw cam 60 encircles a tubular dust bushing 70 located in the central cavity 57 of the chuck body. A front flange 71 of the dust bushing 70 locates the dust bushing in the front end of the central cavity 57. The dust bushing 70 and the central opening 62 of the circular mounting plate 14 guide the annular draw cam 60 in its axial movement when it actuates the chuck.

In a copending application for patent filed Sept. 17, 1965, entitled Chuck, Ser. No. 488,061, assigned to the assignee of the present invention, the concept of a sealed chuck body which provides a substantially sealed lubricant reservoir is disclosed. The structure of this invention, like that of the referenced application, is such that the annular cavity 50 is a substantially sealed chamber which may be filled with grease. To this end O-rings 36, 37 are positioned between the mounting plate 14 and the flange 42 and draw cam 60 respectively.

The portion of the chuck body 38 between the cavities 50 includes axial throughbores that receive the axially extending rods 19. Thus, rotation of the mounting plate 14 and the rods 19 rotates the chuck body 38. The thickness of the chuck body 38 between the mounting plate 14 and the fixed plate 26 is less than the length of the rods 19 and, hence, is less than the distance between the mounting plate 14 and the fixed plate 26. This allows the chuck body 38 to slide axially along the rods 19.

The extent to which the chuck body 38 may slide along the axial rods 19 is limited at the back of the chuck by the front surface 21 of the mounting plate 14, and is limited in the other direction by a plurality of circumferentially spaced gap adjustment screws 75. Each gap adjustment screw 75 extends axially through the body of the chuck, parallel to the rods 19. In the embodiment shown, two gap adjustment screws are positioned adjacent each axial rod 19. See FIGURE 1. One end of each gap adjustment screw is threaded and received in a tapped hole 76 of the circular mounting plate 14. A nylon insert 77 in the threaded portion of the screw 75 that is received in the tapped hole 76 of the mounting plate 14 maintains the gap adjustment screws in any predetermined position of adjustment. The screw head formed at the other end of each gap adjustment screw 75 is received in a recess 78 of the chuck body 38. Thus, a shoulder 79 of the screw head of each gap adjustment screw 75 forms an abutment or stop that engages a shoulder of the screw head recess 78 in the chuck body to limit the forward extent of the sliding movement of the chuck body along the rods 19. Except as limited by the screw heads, the chuck body is movable axially relative to the screws 75.

As shown in FIGURES 2 and 4, the chuck body 38 is at the forward extent of its axial travel along the rods 19. As a result, a small gap indicated at G is formed between the back portion of the chuck body 38 and the front surface 21 of the circular mounting plate 14. The chuck body is biased in this forward position by a plurality of axially extending spaced springs 85 carried in spring pockets 87 of the chuck body. See FIGURES 1 and 4. In the embodiment shown, two such spring pockets and springs are provided adjacent each axially extending rod 19. One end of each spring pocket 87 is formed by a recess in the front surface 21 of the mounting plate 14 and the remaining portion is formed by an axially aligned recess in the chuck body 38. A slidable retaining element or piston 90 is located at the forward end of each spring pocket 87. A bore 92 of smaller diameter than the spring pocket 87 extends through the body of the chuck from the front surface thereof into communication with each spring pocket 87. A front portion 93 of the bore 92 is threaded. An intermediate pin 95 contacts the upper surface of the retaining element or piston 90 and extends through the unthreaded portion of the bore 92 and into the threaded portion. The intermediate pin 95 is slidable within the bore 92. A second, threaded, pin 97 that is shorter than the threaded portion 93 of the bore 92 is carried within the threaded portion 93 and in end-to-end contact with the intermediate pin 95. A short locking pin or screw 99 is also received in the threaded portion 93 of the bore 92 directly in front of the threaded pin 97. Both pins 97 and 99 include recessed sockets. As will be readily apparent from this construction, the threaded pin 97 may be screwed into the threaded portion 93 of the bore 92 to move the intermediate pin 95 and retaining element 90 toward the mounting plate 14 to compress the spring 85. The locking pin 99 is then inserted into the threaded portion 93 and screwed into locking relationship with the pin 97. In this manner, the biasing force of the spring 85 between the chuck body and the mounting plate 14 may be adjusted.

With this construction described, a gap G of predetermined size may be provided between the surface 21 of the mounting plate 14 and the base of the chuck body 38. The gap is created when the adjustment screws 75 are positioned to provide a distance between the mounting plate 14 and the shoulders 79 of the screw heads that is greater than the fixed distance from the base of the chuck body 38 to the base of each adjustment screw head recess 78. Springs 85 bias the chuck body away from the mounting 14 and into engagement with the shoulders 79 of the heads of the adjustment screws 75.

As indicated in FIGURES 2 and 3, work engaging jaws 106 are carried by the master radial jaws 45 of the chuck. The portion of the work engaging jaws 106 that engage a work piece W are located in front of the fixed plate 26 and a finished surface f of the work piece W is positioned adjacent the locating surface 33 of the fixed plate 26.

In operation, a work piece W is placed between the work engaging jaws 106, with a radial finished surface f adjacent the locating surface 33 of the fixed plate 26. The draw rod of the machine tool is then actuated to pull the draw cam 60 from an initial position as shown in FIGURE 2 to a withdrawn position as shown in FIGURE 3. During such movement the cam surface 63 of the draw cam 60 cooperates with the contoured end surface of the longer arm of each operating lever 52 to pivot the lever about the lever pin 54 and move the radial jaws 45 and 106 toward the central axis of the chuck to grip the work piece. When the work engaging jaws 106 fastened to the master radial jaws 45 engage the periphery of the work piece, further inward movement of the jaws is restricted. Further force applied by the draw rod and draw cam 60 exerts a pulling force upon the chuck body 38 via the operating levers 52 and the lever pins 54 secured within the chuck body. Because the chuck body 38 is free to slide axially on the rods 19, as soon as the force exerted by the draw rod and draw cam is sufficient to overcome the biasing force of the springs 85, the chuck body and work engaging jaws will move axially toward the fixed mounting plate 14. The maximum axial movement is determined by the size of the gap G between the chuck body 38 and the front surface 21 of the mounting plate 14. This distance generally need not be more than 0.015 inch. Such axial movement of the chuck body pulls the engaged work piece back against the locating surface 33 of the fixed spiderplate 26, orienting the finished radial surface of the work piece in proper relationship with the chuck. The actual axial movement is normally limited by the contact of the work piece with the plate 26. Thereafter, all additional force exerted by the draw rod and draw cam 60 is transmitted through the operating levers 52 and radial jaws 45 as a work gripping force upon the periphery of the work piece.

The size of the gap G that is provided between the front surface 21 of the mounting plate 14 and the rear surface of the chuck body 38 may be accurately set to whatever dimension is desired. The gap may be conveniently adjusted by pulling the chuck body back flush against the front face 21 with the draw rod and draw cam 60, and measuring the distance between a front surface of the chuck (such as the radial front face 44 or the face of flange 71 of the dust bushing) and the finished inner surface 32 of the spider-shaped fixed plate 26. The gap adjustment screws 75 may then be loosened, and a gauge block of a predetermined smaller dimension than the distance between the front surface of the chuck and the surface 32 of the fixed plate inserted between the fixed plate and the chuck. Pressure on the draw cam is then released and the chuck is biased forward by the springs 85 a distance limited by the thickness of the gauge block. The gap adjustment screws 75 are then adjusted by tightening until the gauge block drops out and a gap G is provided that is equal to the difference between the original distance from the front of the chuck to the finished inner surface 32, and the thickness of the gauge block.

An outstanding feature of the chuck of this invention is that it may readily be used without the pull back feature. Thus, when it is desired, the pull back feature may be eliminated by merely drawing the chuck back against the mounting plate 14 against the biasing force of the springs 85 and then tightening the gap adjustment screws 75 to maintain the chuck against the plate 14, thereby eliminating the gap G.

While a preferred embodiment of this invention has been described with particularity, numerous modifications or alterations may be made therein without departing from the spirit and scope of the invention, as set forth in the appended claims.

What is claimed is:

1. In a rotatable jaw chuck, a chuck mounting plate adapted to be mounted on a machine tool spindle for rotation about a central axis perpendicular to the plane of the plate; a chuck body having a plurality of radially movable jaws; a plurality of posts extending axially from the mounting plate through at least a portion of the chuck body to support, rotate and guide the chuck body, said chuck body having passageways for receiving the posts and constructed and arranged to slide axially along the posts; adjustable stop means supported by the mounting plate and independent of said posts for coacting with the chuck body to limit the extent of sliding movement of the chuck body along the posts, said stop means being positionable to clamp the chuck body firmly against the mounting plate to prevent the body from sliding along the posts; resilient means acting between the mounting plate and the chuck body to resiliently bias the chuck body in a direction away from the mounting plate; means carried by the chuck body for varying the force with which the resilient means biases the chuck body in the said direction; and a locating surface disposed parallel to the mounting plate, supported by said posts in fixed relationship with the mounting plate and axially spaced from the mounting plate at a location beyond the chuck body; whereby the chuck body is selectively slidable between the mounting plate and the locating surface or secured against the mounting plate.

2. In a rotatable jaw chuck, a chuck mounting plate adapted to be mounted on a machine tool spindle for rotation about a central axis perpendicular to the plane of the plate; a chuck body having a plurality of radially movable jaws; a plurality of posts extending axially from the mounting plate through at least a portion of the chuck body, said chuck body having passageways for receiving the posts and constructed and arranged to slide axially along the posts; means to clamp the chuck body firmly against the mounting plate to prevent the body from sliding along the posts; resilient means acting between the mounting plate and the chuck body to resiliently bias the chuck body in a direction away from the mounting plate; and a locating surface carried by the mounting plate in fixed, spaced, relationship thereto; whereby the chuck body is selectively axially slidable relative to the mounting plate and the locating surface or secured against the mounting plate.

3. In a rotatable jaw chuck, a chuck mounting plate adapted to be mounted on a tool spindle for rotation about a central axis perpendicular to the plane; a chuck body having a plurality of radially movable jaws; means extending axially from the mounting plate through at least a portion of the chuck body for supporting the chuck body for axially sliding movement relative to the mounting plate; adjustable stop means supported by the mounting plate for coacting with the chuck body to limit the extent of axial sliding movement of the chuck body and for clamping the chuck body firmly against the mounting plate; resilient means acting between the mounting plate and the chuck body to resiliently bias the chuck body in a direction away from the mounting plate; and a locating surface supported by the mounting plate in fixed relationship thereto; whereby the chuck body is selectively slidable relative to the mounting plate and the locating surface.

4. In a rotatable jaw chuck, a chuck mounting plate adapted to be mounted on a machine tool spindle for rotation about a central axis perpendicular to the plane of the plate; a chuck body having a plurality of radially movable jaws; means extending axially from the mounting plate through at least a portion of the chuck body for supporting the chuck body for axially sliding movement relative to the mounting plate; adjustable stop means supported by the mounting plate for coacting with the chuck body to limit the extent of axial sliding movement of the chuck body; means to retain the stop means in adjusted position; resilient means acting between the mounting plate and the chuck body to resiliently bias the chuck body in a direction away from the mounting plate; means carried by the chuck body and independent of chuck body movement for varying the force with which the resilient means biases the chuck body in the said direction; and a locating surface supported by the mounting plate and axially spaced from the mounting plate; whereby the chuck body is slidable relative to the mounting plate and the locating surface.

5. A rotatable jaw chuck comprising a first body constructed to be secured to a machine tool or the like, a second body secured to the first body in rotatively fixed relationship and movable toward and away from the first body along a common axis, chuck jaws carried by the second body for gripping a work piece and securing the work piece to the second body, a work piece locating surface fixed relative to the first body, means for moving the second body axially with respect to both the first body and the work piece locating surface, and means to clamp the second body to the first body to selectively prevent relative axial movement between the two.

6. A jaw chuck adapted to be mounted on a machine tool spindle for rotating a work piece about the axis of said spindle and coactable with a draw bar or the like in said machine tool, the improvement which comprises:
(a) an axially fixed rotatable driving body adapted to be mounted upon a spindle,
(b) an axially movable driven body connected to the fixed body,
(c) a plurality of chuck jaws movably mounted on the driven body,
(d) means to connect a draw bar to said jaws and to said driven body such that movement of the draw bar shifts the jaws for work gripping and work releasing action and causes movement of said driven body axially with respect to the driving body,
(e) stop means connected to one of the bodies and coactable with the other of the bodies to limit axial movement of the driven body relative to the driving body in a direction away from the driving body when the draw bar is actuated in work releasing action and the driven body is shifted away from the drive body, and
(f) means cooperating with the stop means and the driving body to hold the stop means in adjusted positions that vary the extent of allowable axial movement of the driven body.

7. The device of claim 6 wherein the stop means is adjustable to clamp the driven body against the driving body.

8. The device of claim 6 wherein seal means are interposed between the driving and driven bodies and between the driving body and the draw bar respectively whereby said bodies define a substantially sealed chamber.

9. In a jaw chuck having a rear mounting plate, a generally cylindrical chuck body, a plurality of radially movable master chuck jaws and attached work gripping jaws, a plurality of jaw operating levers within the chuck body, one associated with each jaw, to move the jaws radially relative to the chuck body, and means within the chuck body to operate the levers to move the jaws, the improvement which comprises a work locating surface spaced in front of the chuck body and master jaws and behind portions of the work gripping jaws in fixed relationship with respect to the mounting plate, means fastened to the mounting plate for supporting the chuck body for rotation with the mounting plate and for axial movement relative thereto, resilient means biasing the chuck body axially away from the mounting plate toward the work locating surface, and adjustable abutment means carried by the rear mounting plate for engaging the chuck body and limiting the axial movement of the body away from the plate in response to the resilient means and means to retain the abutment means in adjusted positions.

10. In a jaw chuck, a rear mounting plate; a chuck body having a front radial face; a plurality of radially movable jaws extending from the front face of the chuck body; a radially disposed work locating surface spaced from the front face of the chuck; means mounting the work locating surface to the rear mounting plate and also supporting the chuck body and causing the chuck body to rotate with the mounting plate while permitting axial movement of the chuck body with respect thereto; resilient means acting between the rear mounting plate and the chuck body biasing the chuck body axially away from the mounting plate and toward the radially disposed work locating surface; an adjustable abutment means carried by the rear mounting plate for engaging the chuck body and limiting the axial movement of the body away from the plate in response to the resilient means; means to retain the abutment means in adjusted positions; and means, including an axially movable member at least partially within the chuck body and associated jaw levers fixed for rotational movement within the chuck body, for first moving the jaws radially of the chuck body toward the center thereof to engage a work piece between the jaws and to exert a gripping force thereon, for thereafter moving the chuck body against the bias of the resilient means toward the mounting plate, and for exerting further gripping force on the work piece by tending to further move the jaws radially of the chuck body toward the center thereof, whereby a work piece is gripped, pulled into firm contact with the work locating surface and then firmly held in the chuck jaws.

References Cited

UNITED STATES PATENTS

| | | | |
|---|---|---|---|
| 1,400,272 | 12/1921 | Ellis | 279—122 |
| 1,487,411 | 3/1924 | Wasson. | |
| 2,739,818 | 3/1956 | Benjamin | 279—2 |
| 1,713,978 | 5/1929 | Olson | 279—119 |
| 2,524,485 | 10/1950 | Sloan | 279—119 |
| 3,266,812 | 8/1966 | Mott | 279—121 |

OTHER REFERENCES

Exhibit A—Photoprint of drawing for "Chuck for Gate Valve Wedges," the Cushman Chuck Co., Hartford, Conn. Drawing numbered W-2351.

ROBERT C. RIORDON, *Primary Examiner.*